(No Model.)

H. MORRISON.
CHAIN DRIVING WHEEL.

No. 587,848. Patented Aug. 10, 1897.

Witnesses.
Benjamin Clark
James Fleming

Inventor
Harry Morrison
per E. Eaton.
His Attorney.

THE NORRIS PETERS CO., PHOTO-LITHO., WASHINGTON, D. C.

UNITED STATES PATENT OFFICE.

HARRY MORRISON, OF LONDON, ENGLAND.

CHAIN-DRIVING WHEEL.

SPECIFICATION forming part of Letters Patent No. 587,848, dated August 10, 1897.

Application filed October 26, 1896. Serial No. 610,120. (No model.)

*To all whom it may concern:*

Be it known that I, HARRY MORRISON, a subject of the Queen of Great Britain, and a resident of London, England, have invented certain new and useful Improvements in Chain-Driving Wheels, of which the following is a full, clear, and exact specification.

This invention consists in improvements in chain-driving wheels, the object being to enable the wear which takes place in the links of the chain to be readily taken up or compensated for when required.

It has been found that when a chain becomes slack through use and wear it is not possible to tighten this chain and at the same time to compensate for or take up the wear of same between the links, and although the chain may be tight the links cannot fit closely upon the teeth. In order to overcome this difficulty, I make the teeth or spurs radially adjustable.

In order that my invention may be fully understood, I will now refer to the annexed drawings, in which—

Figure 1:
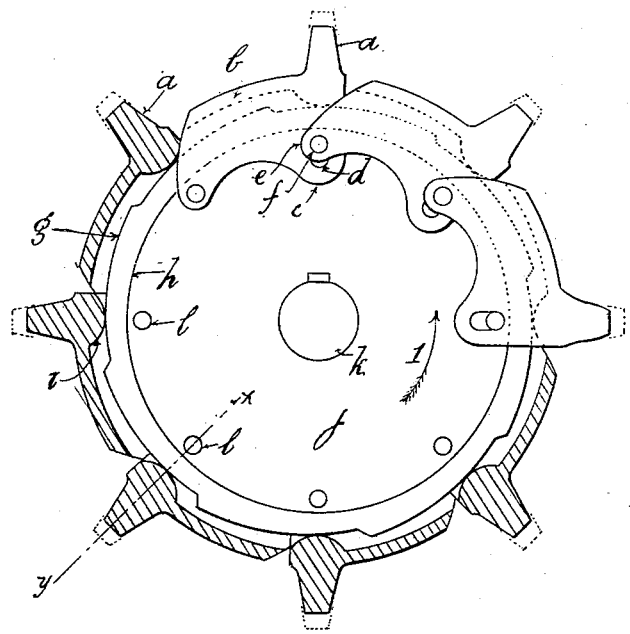
Figure 2:
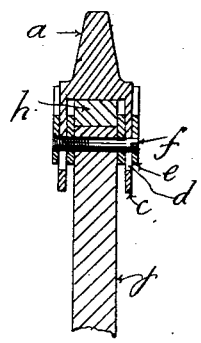

Figure 1 is a side elevation, partly in section, showing a means of carrying out my invention; Fig. 2, a cross-section through line $x\ y$ in Fig. 1.

$a$ are the teeth or spurs, which are formed integral with or attached to the links or connecting-pieces $b$, the ends $c$ of which are provided with slots $d$, and the ends $e$ are provided with holes through which a pin $f$ passes.

$g$ is a ring or collar which has the inclined surfaces $h$, upon which the ends $i$ of the teeth or spurs $a$ engage. This ring or collar is supported upon the periphery of the wheel or drum $j$, which is keyed or fixed to the axle or spindle $k$ and is capable of motion upon the web of the wheel $j$. $l$ are apertures in said wheel or drum through which the pins $f$ pass, said pins being secured upon the outside of the links or connecting-pieces $b$ by means of nuts or bolts or any such convenient means.

It will be seen that by rotating the ring $g$ the inclined surfaces or planes will cause the teeth or spurs to be moved from the center of the wheel in a radial direction, as shown by the dotted line and arrow $i$, and thus proportionately increasing the distance between each tooth or spur, and so causing the links of a chain to closely engage upon the teeth or spurs after having been worn. It will be seen that any well-known means for locking the parts in the required position of adjustment may be employed, and although I have shown in the drawings a means of carrying this invention into effect I do not confine myself to this particular arrangement, as my invention consists in the radial adjustment of the teeth or spurs upon a chain-driving wheel, and there are many mechanical arrangements by which this object can be carried out; but I prefer the arrangement as shown in Fig. 1. The shape of the teeth or angle of same may be varied to suit the class of link or chain employed. Another feature of my invention lies in the fact that the wearing of the teeth or spurs will not affect the links fitting closely upon the teeth, as will be readily seen, and owing to this close fitting of the links upon the teeth or spurs a great saving in wear is effected and greater efficiency obtained and the noise or rattling caused by a loose-fitting link upon a tooth or spur is avoided. It will also be seen that by decreasing the distance between the teeth or spurs and the center of the wheel various sizes of links or chains may be used.

Having thus described my invention, what I claim, and desire to secure by Letters Patent, is—

In a sprocket-wheel, the combination of the central web, an annular rim having a series of inclines, mounted on said web, a series of teeth separately pivoted to said web, said teeth being adapted to engage said inclines, whereby said teeth are adjusted radially, and means to limit said adjustment, substantially as described.

In testimony that I claim the foregoing I have hereunto set my hand this 3d day of September, 1896.

H. MORRISON.

Witnesses:
JAMES FLEMING,
WM. WEEKS.